(12) United States Patent
Stork et al.

(10) Patent No.: US 7,997,392 B2
(45) Date of Patent: Aug. 16, 2011

(54) VIBRATION DAMPER

(75) Inventors: Michael Stork, Darmstadt (DE); Horst Rosenfeldt, Gross-Zimmern (DE)

(73) Assignee: Fludicon GmbH, Darmstadt (DE)

(*) Notice: Subject to any disclaimer, the term of this patent is extended or adjusted under 35 U.S.C. 154(b) by 0 days.

(21) Appl. No.: 12/451,597

(22) PCT Filed: May 19, 2008

(86) PCT No.: PCT/EP2008/003993
§ 371 (c)(1),
(2), (4) Date: Nov. 19, 2009

(87) PCT Pub. No.: WO2008/141787
PCT Pub. Date: Nov. 27, 2008

(65) Prior Publication Data
US 2010/0116606 A1    May 13, 2010

(30) Foreign Application Priority Data
May 21, 2007   (DE) .......................... 10 2007 023 817

(51) Int. Cl.
*F16F 15/03* (2006.01)
(52) U.S. Cl. .................................... 188/267.1
(58) Field of Classification Search ........ 188/267–267.2
See application file for complete search history.

(56) References Cited

U.S. PATENT DOCUMENTS

| | | |
|---|---|---|
| 2,661,596 A | 12/1953 | Winslow |
| 4,139,186 A * | 2/1979 | Postema et al. .......... 188/322.19 |
| 4,790,522 A | 12/1988 | Drutchas |
| 4,819,772 A | 4/1989 | Rubel |
| 4,880,216 A | 11/1989 | Haertel et al. |
| 4,896,752 A | 1/1990 | Shtarkman |
| 4,898,084 A | 2/1990 | Oppermann et al. |
| 5,018,606 A | 5/1991 | Carlson |

(Continued)

FOREIGN PATENT DOCUMENTS

DE           34 43 183          5/1986

(Continued)

OTHER PUBLICATIONS

International Search Report of the International Searching Authority for International Application PCT/EP2008/003993, mailed Sep. 25, 2008, 2 pages, European Patent Office, HV Rijswijk, Netherlands.

(Continued)

*Primary Examiner* — Christopher P Schwartz
(74) *Attorney, Agent, or Firm* — W. F. Fasse; W. G. Fasse

(57) ABSTRACT

A vibration damper, e.g. for damping retraction or extension springing forces on motor vehicles, includes a pressure medium cylinder in which a piston with a piston rod is axially slidably arranged. The piston divides the cylinder into first and second chambers which contain an electrorheological or magnetorheological fluid as a pressure medium. The two chambers are connected with one another through a throttle gap with at least one field generating element arranged adjacent thereto. The length of the throttle gap is divided by a gap intersection point into a first throttle gap section connected with the first chamber, and a second throttle gap section connected with the second chamber. A non-return check valve is arranged in a bypass gap connected parallel to the first throttle gap section between the gap intersection point and the first chamber.

20 Claims, 3 Drawing Sheets

U.S. PATENT DOCUMENTS

| | | | |
|---|---|---|---|
| 5,259,487 A * | 11/1993 | Petek | 188/267.1 |
| 5,316,112 A | 5/1994 | Kimura et al. | |
| 5,353,839 A | 10/1994 | Kordonsky et al. | |
| 5,353,897 A | 10/1994 | Woessner | |
| 5,449,150 A | 9/1995 | Watanabe et al. | |
| 5,458,217 A | 10/1995 | Ohishi | |
| 5,477,946 A | 12/1995 | Kawamata et al. | |
| 5,489,009 A | 2/1996 | Kawamata et al. | |
| 5,553,828 A | 9/1996 | Jaenker | |
| 5,588,509 A | 12/1996 | Weitzenhof et al. | |
| 5,590,745 A | 1/1997 | Rensel et al. | |
| 5,884,959 A | 3/1999 | Hillen | |
| 5,934,422 A * | 8/1999 | Steed | 188/318 |
| 5,947,238 A | 9/1999 | Jolly et al. | |
| 6,095,486 A | 8/2000 | Ivers et al. | |
| 6,131,709 A | 10/2000 | Jolly et al. | |
| 6,152,488 A | 11/2000 | Hedderly et al. | |
| 6,158,470 A | 12/2000 | Ivers et al. | |
| 6,189,919 B1 | 2/2001 | Sinnhuber et al. | |
| 6,375,220 B1 | 4/2002 | Kamm | |
| 6,378,558 B1 | 4/2002 | Pohl et al. | |
| 6,419,057 B1 | 7/2002 | Oliver et al. | |
| 6,695,102 B1 * | 2/2004 | Marjoram et al. | 188/267.2 |
| 6,745,876 B2 * | 6/2004 | Beck | 188/267.2 |
| 6,749,045 B2 * | 6/2004 | Rosenfeldt et al. | 188/267.1 |
| 6,874,603 B2 | 4/2005 | Lisenker et al. | |
| 2001/0054529 A1 | 12/2001 | Wendt et al. | |
| 2002/0185347 A1 | 12/2002 | Pohl et al. | |
| 2003/0127293 A1 * | 7/2003 | Rosenfeldt et al. | 188/267.1 |

FOREIGN PATENT DOCUMENTS

| | | |
|---|---|---|
| DE | 36 31 107 | 3/1988 |
| DE | 36 32 562 | 4/1988 |
| DE | 37 09 447 | 10/1988 |
| DE | 38 08 521 | 4/1989 |
| DE | 40 02 448 | 8/1990 |
| DE | 197 17 704 | 10/1998 |
| DE | 198 20 570 | 11/1999 |
| DE | 696 04 865 | 2/2000 |
| DE | 698 08 600 | 6/2003 |
| DE | 103 20 005 | 10/2004 |
| DE | 603 05 859 | 11/2006 |
| EP | 0 261 427 | 3/1988 |
| EP | 0 382 171 | 8/1990 |
| EP | 0 460 808 | 12/1991 |
| EP | 0 534 327 | 3/1993 |
| EP | 0 581 476 | 2/1994 |
| EP | 0 673 478 | 3/1997 |
| EP | 0 769 637 | 4/1997 |
| EP | 0 882 636 | 12/1998 |
| EP | 1 034 383 | 9/2000 |
| EP | 1 273 820 | 1/2003 |
| EP | 1 437 526 | 7/2004 |
| FR | 1 419 551 | 10/1965 |
| GB | 1 278 764 | 6/1972 |
| GB | 1 282 568 | 7/1972 |
| GB | 1 381 785 | 1/1975 |
| GB | 1 599 565 | 10/1981 |
| GB | 2 193 785 | 2/1988 |
| JP | 5-187471 | 7/1993 |
| WO | WO 99/22162 | 5/1999 |
| WO | WO 99/27273 | 6/1999 |

OTHER PUBLICATIONS

English Translation of PCT Written Opinion of the International Searching Authority for International Application PCT/EP2008/003993, mailed Sep. 25, 2008, 7 pages, European Patent Office, HV Rijswijk, Netherlands.

Office Action in German Patent Application 10 2007 026 378.5-12, mailed Feb. 22, 2008, 4 pages, German Patent and Trademark Office, Muenchen, Germany, with partial English Translation included in IDS.

Literal Translation of PCT International Application PCT/EP99/03123, filed on May 6, 1999, 19 pages.

"Applications of the Electrorheological Effects in Engineering Practice", by Gorodkin et al.; Fluid Mechanics, Soviet Research, vol. 8, No. 4, Jul.-Aug. 1979, pp. 48-61.

* cited by examiner

VIBRATION DAMPER

FIELD OF THE INVENTION

The invention relates to a vibration damper, especially for the damping of retraction or extension springing forces on motor vehicles according to the preamble of the patent claim 1.

BACKGROUND INFORMATION

For today's typical chassis for motor vehicles, there is a striving that the damper forces for the extension and retraction springing respectively have a relationship in the ratio 2:1 to 4:1. If regulated hydraulic or pneumatic dampers with a characteristic field are utilized for that purpose, then the regulation quality is, however, limited with such a force relationship. Therefore, quickly regulatable vibration dampers are necessary for such regulation circuits.

From the DE 103 20 005 B3, a quickly regulatable vibration damper with adjustable damping force is known, which operates with a magnetorheological fluid. This vibration damper consists of a cylinder in which a piston rod is axially movably guided. This cylinder is surrounded with a further cylindrical housing, in which two throttle paths are arranged, which connect with one another the cylinder chambers that are separated by the piston. A magnetorheological fluid is arranged in the two cylinder chambers, and the viscosity of the magnetorheological fluid is controllable in the area of the throttle paths. For that purpose, field force generating elements are arranged on the throttle paths, and the electrical current supply of the field force generating elements is controlled so that the viscosity of the magnetorheological fluid adjusts itself corresponding to the desired damping. In a particular embodiment of this vibration damper, two independently controllable throttle paths are provided, which make possible a separation of the damping force adjustment dependent on the throughflow direction. Still additionally, non-controllable connection channels are provided in both throttle path inserts, and respectively one non-return check valve for separating the connections channels is arranged in each one of the connection channels. Because the two non-return check valves are oriented contrary to one another and are embodied the same in both throttle paths, the result is that always the same throughflow quantity arises in both throughflow directions, so that also with such a vibration damper the damping regulation of different damper forces for retraction and extension springing or spring travel requires a large regulation spread or range, whereby also in this case the regulation quality is limited.

SUMMARY OF THE INVENTION

Therefore it is the underlying object of the invention to improve a vibration damper of the above mentioned type in such a manner so that therewith different damper forces for the extension or retraction springing or spring travel are exactly regulatable in a simple manner.

The above object has been achieved according to the invention in a vibration damper which includes a pressure medium cylinder, in which a piston with a piston rod is arranged in an axially slidable manner. The piston divides the pressure medium cylinder into a retraction chamber and an extension chamber, in which an electrorheological or magnetorheological fluid is contained as a pressure medium. The retraction chamber and the extension chamber are connected with one another at least by a throttle gap in the region of which at least one field force generating element is arranged. A length of the throttle gap is divided by a gap intersection point into a first throttle gap section and a second throttle gap section. The second throttle gap section is connected with the extension chamber and the first throttle gap section is connected with the retraction chamber. At least one non-return check valve is arranged in a bypass gap, which is connected parallel to the first throttle gap section between the gap intersection point and the retraction chamber.

The invention has the advantage that with such vibration dampers large differences of the damper forces during the extension and retraction springing or spring travel can be regulated-out in common very quickly. In that regard, by the selection of the gap intersection or gating point, advantageously the relationship or ratio of the damper forces can be changed, without impairing the regulation quality.

BRIEF DESCRIPTION OF THE DRAWINGS

The invention will be more closely explained in connection with an example embodiment which is shown in the drawing. It is shown by.

DETAILED DESCRIPTION OF EXAMPLE EMBODIMENTS OF THE INVENTION

Figure 1:
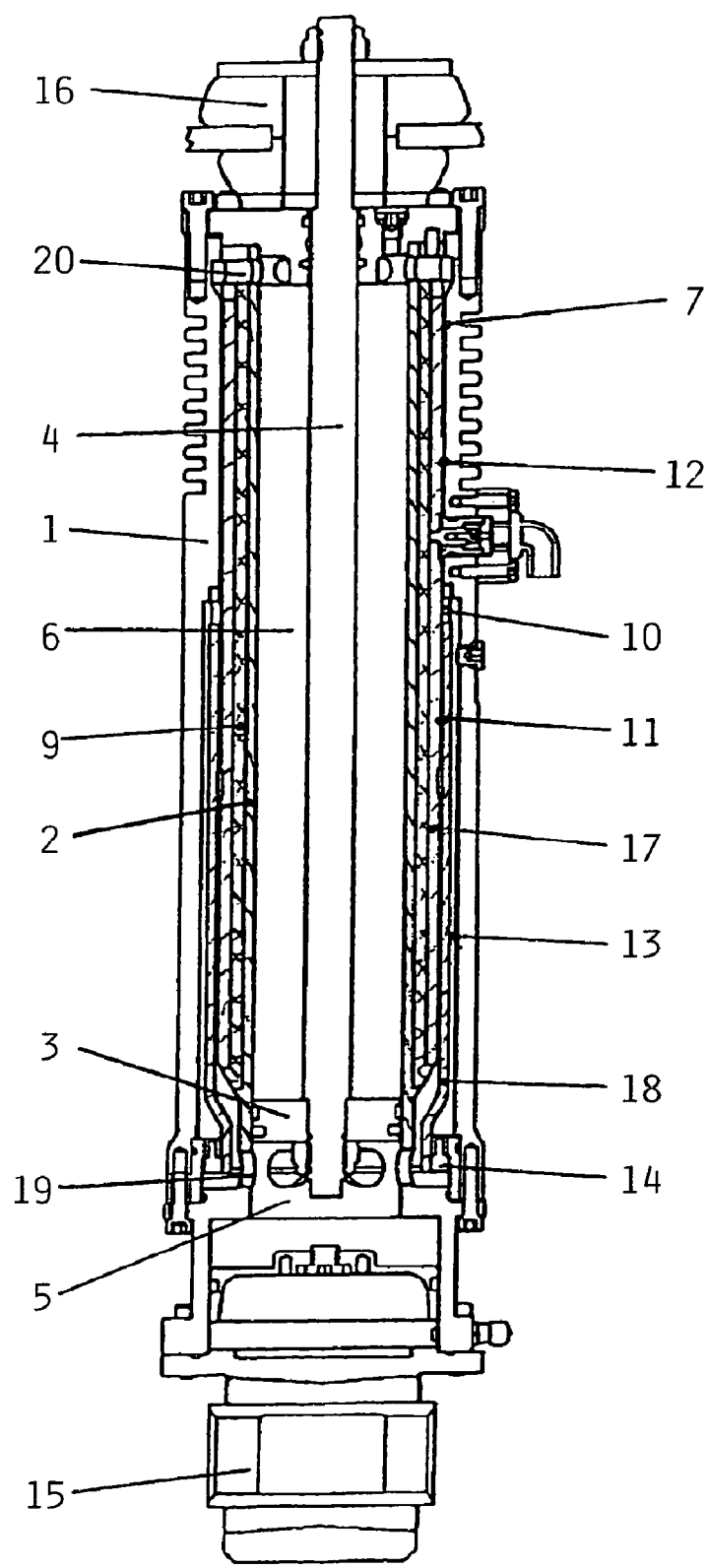
FIG. 1: an electrorheological vibration damper with a throttle and bypass gap in the cylindrical housing.

FIG. 1 of the drawing shows a controllable vibration damper with electrorheological fluid, which is embodied as a shock absorber for a motor vehicle. In this vibration damper, a piston 3 with a piston rod 4 is arranged in a cylindrical housing 1 with an inner pipe 2. Thereby the inner pipe 2 forms a pressure medium chamber, which is divided by the piston 3 into an extension chamber 6 and a retraction chamber 5. The two pressure medium chambers 5, 6 are connected with one another through a ring-shaped axial throttle gap 7 in the cylindrical housing 1. In that regard, the throttle gap 7, between its end regions, comprises a gap intersection or gating point 10, which divides the throttle gap 7 into a first throttle gap section 11 and a second throttle gap section 12. Still additionally a bypass gap 13 is connected to the gap intersection or gating point 10, whereby the bypass gap 13 is arranged parallel and coaxially to the first throttle gap section 11 in the cylindrical housing 1 and is connected with the retraction chamber 5 and contains a non-return check valve 14 that is open toward this retraction chamber 5, i.e. it allows the electrorheological fluid to flow from the retraction chamber 5 to the extension chamber 6 via the bypass crap 13 through the open check valve 14. In the opposite flow direction, the check valve 14 is closed.

The vibration damper embodied as a shock absorber is preferably installed vertically in a motor vehicle and includes, at its lower end, a first bearing element 15 that is preferably connected with a vehicle axle. In that regard a second bearing element 16 is provided in its upper end, and the second bearing element 16 is rigidly connected with the piston rod 4 and secured on the vehicle chassis. The housing 1 arranged between the bearing elements 15, 16 is embodied as a cylindrical outer pipe and coaxially surrounds the inner pipe 2 in which the sealed piston 3 is axially moveably guided. Thereby the pressure medium chamber portion out of which the piston rod 4 is extendable as an extension chamber represents an extension springing chamber 6, and the pressure medium chamber portion into which the piston rod 4 is retractable as a retraction chamber represents the retraction springing chamber 5, which are filled through a filling and venting port 23 with an electrorheological fluid in the operating condition.

An insulation 9 is applied on the outer wall of the inner pipe 2, and a tube-shaped electrode 17 or several segment-like electrodes 17 are provided as field force generating elements on the insulation 9 coaxially to the inner pipe 2. In that regard, the electrode 17 is connected with a high voltage source outside of the vibration damper via an external electrical connector 22. The electrode 17 is preferably embodied pipe-shaped and surrounds the throttle gap 7 on its entire axial length and is arranged coaxially to the inner pipe 2.

Still further an intermediate pipe 18 is provided coaxially to the first throttle gap section 11, and the intermediate pipe 18 extends over a prescribed axial length that ends on the gap intersection or gating point 10. The bypass gap 13 is arranged between the intermediate pipe 18 and the outer wall of the pipe-shaped housing 1, and the bypass gap 13 is connected with the inwardly lying throttle gap 7 via the gap intersection or gating point 10 at the end of the intermediate pipe 18.

In the bottom part and on its end region, the first throttle gap section 11 is connected via a retraction springing bore 19 with the retraction springing chamber 5, and the upper second throttle gap section 12 is connected via an extension springing bore 20 with the extension springing chamber 6. The non-return check valve 14 is provided in the lower end region of the bypass gap 13, and is opened toward the retraction springing bore 19 (i.e. it allows fluid to flow from the bore 19 through the check valve 14) and is thereby connected with the retraction springing chamber 5.

For damping the driving vibrations that are introduced from a vehicle wheel via the axle, the lower bearing element 15 is moved axially relative to the upper bearing element 16 that is secured on the vehicle chassis. During the extension springing, the bearing element 15 moves downwardly while the bearing element 16 can be regarded as standing still. Thereby a pressure is exerted on the upper piston surface by the electrorheological fluid as a pressure medium located in the extension springing chamber 6, through which the electrorheological fluid located in the extension springing chamber 6 flows via the second throttle gap section 12 and the first throttle gap section 11 into the retraction springing chamber 5. Thereby the piston 3 moves with its piston rod 4 vertically upwardly into the extension springing chamber 6. Thereby the electrorheological fluid in the uninfluenced condition behaves like a hydraulic fluid, so that such a shock absorber without control voltage basically works like a typical conventional hydraulic shock absorber. The ring-shaped arranged non-return check valves 14 are then closed, so that no fluid can flow back through the bypass gap 13. Thereby the damping effect is determined essentially by the cross-section and length of the throttle gap 7 (gap length 11+12).

The damping effect of such a shock absorber can now additionally be increased by application of a control voltage to the electrode 17, whereby the viscosity of the electrorheological fluid correspondingly changes. Namely by the application of a control voltage, an electrical field is generated, by which the viscosity of the electrorheological fluid can be increased as desired. Therefore the vibration damper is preferably controlled so that, in connection with high retraction springing velocities, corresponding to a prescribed retraction springing characteristic curve, the voltage is increased so far so that the wheel vibrations relative to the vehicle chassis are correspondingly damped. Because a force is transmitted onto the vehicle chassis by the retraction springing vibration, as a result thereof there also arises an extension springing vibration that shall also be correspondingly damped.

In order to especially effectively damp the vehicle vibrations, there is presently a striving to damp the interfering extension springing vibrations at least twice to four times as strongly, in order to avoid the reaction or following vibration of the chassis. For that purpose, as a solution the invention has provided a gap intersection or gating point 10 in the cylindrical housing 1, onto which gap intersection or gating point 10 a bypass gap 13 is arranged parallel to the first throttle gap section 11, whereby this bypass gap 13 takes up the main volume flow of the electrorheological fluid during the retraction springing vibration due to the then-opened non-return check valve 14. In contrast, thereby simultaneously during the extension springing vibration the damper force is automatically increased, because then the non-return check valve 14 is closed. Thereby, the force relationship or ratio between the damping of the retraction springing forces and the damping of the extension springing forces is already given by the axial arrangement of the gap intersection or gating point 10. If now the extension springing vibration is to be damped twice as strongly as the retraction springing vibration, then, depending on the gap dimensions, there arises a gap intersection or gating point 10 preferably approximately in the middle of the axial length of the shock absorber. If now a ratio of 4:1 between the extension springing forces and the retraction springing forces is prescribed, then the gap resistance is to be correspondingly increased by a lengthening of the bypass gap 13 and a shortening of the second throttle gap section 12. Through the arrangement of the gap intersection or gating point 10 as well as the embodiment of the throttle gap sections 11, 12 as well as that of the bypass gap 13, therefore the ratio of the extension springing forces to the retraction springing forces can be changed as desired in a simple manner, and this without additional regulation of the viscosity of the electrorheological fluid.

Thus, in the provided example embodiment, a vibration-dependent damping is possible by a uniform voltage regulation on the two throttle gaps 11, 12, whereby automatically the extension springing vibration is more strongly damped than the retraction springing vibration. Thereby the regulation quality remains unchanged over the entire regulation range. Furthermore, the fail-safe behavior is improved insofar as the ratio of the basic damper forces for retraction and extension springing remains the same in the event of a voltage failure. In a different embodiment of the vibration damper, with a two-part electrode 17, the first throttle gap section 11 can be controlled differently from the second throttle gap section 12. Thereby the ratio of the extension springing forces relative to the retraction springing forces can additionally still be changed during driving. Hereby especially still fine adjustments or adaptations are possible, which were not taken into consideration in the prescribed mechanical arrangement of the gap intersection or gating point. The invention is similarly possible also with a magnetorheological fluid and a corresponding magnetic field force generation.

Moreover, several intersection or gating points 10 can be provided within various different radial sectors within the cylindrical housing 1, and several separate bypass gaps 13 extend axially away from the several intersection or gating points 10, and non-return check valves 14 are arranged respectively in the bypass gaps 13. The non-return check valves can also be embodied as separately controlled electromagnetic, electrorheological, or magnetorheological valves. The non-return check valves 14 may, however, also be replaced by adjustable overflow valves.

Figure 2:
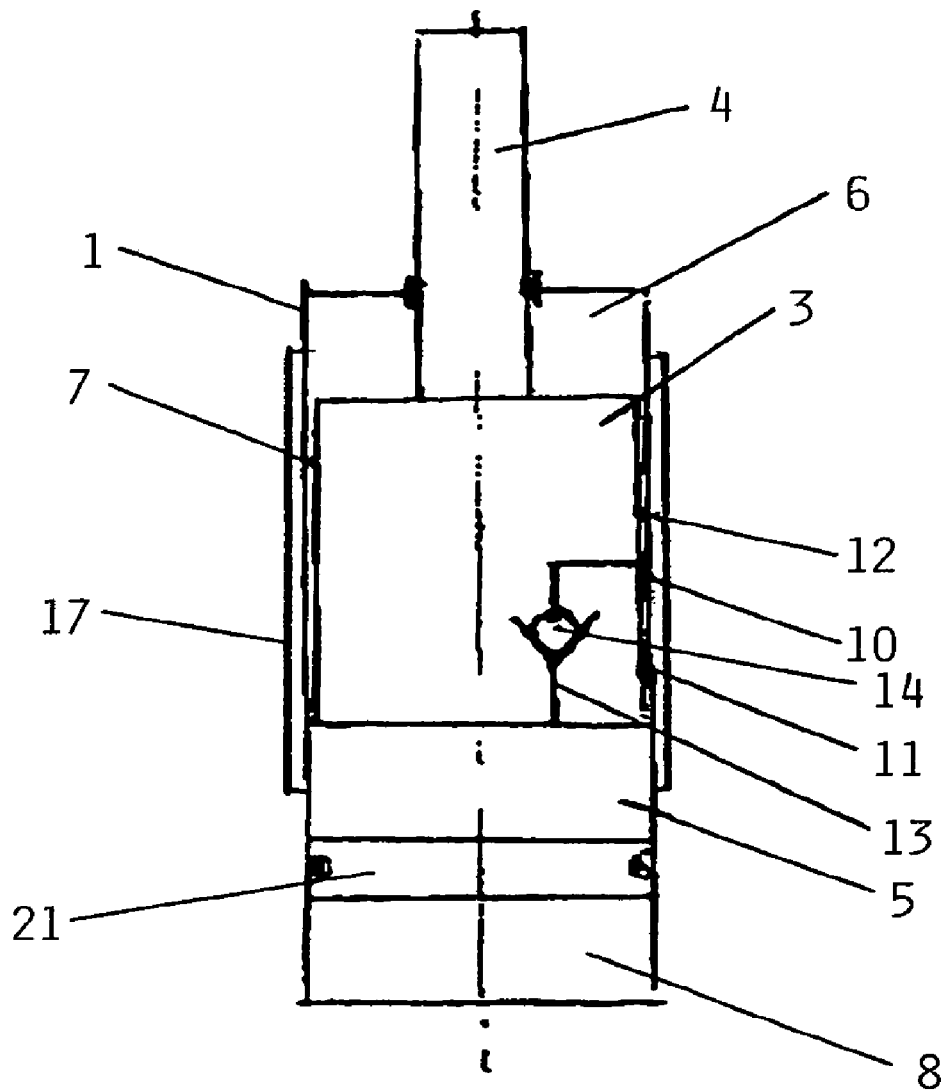
FIG. 2: an electrorheological vibration damper with a throttle and bypass gap in the piston.
Figure 3:
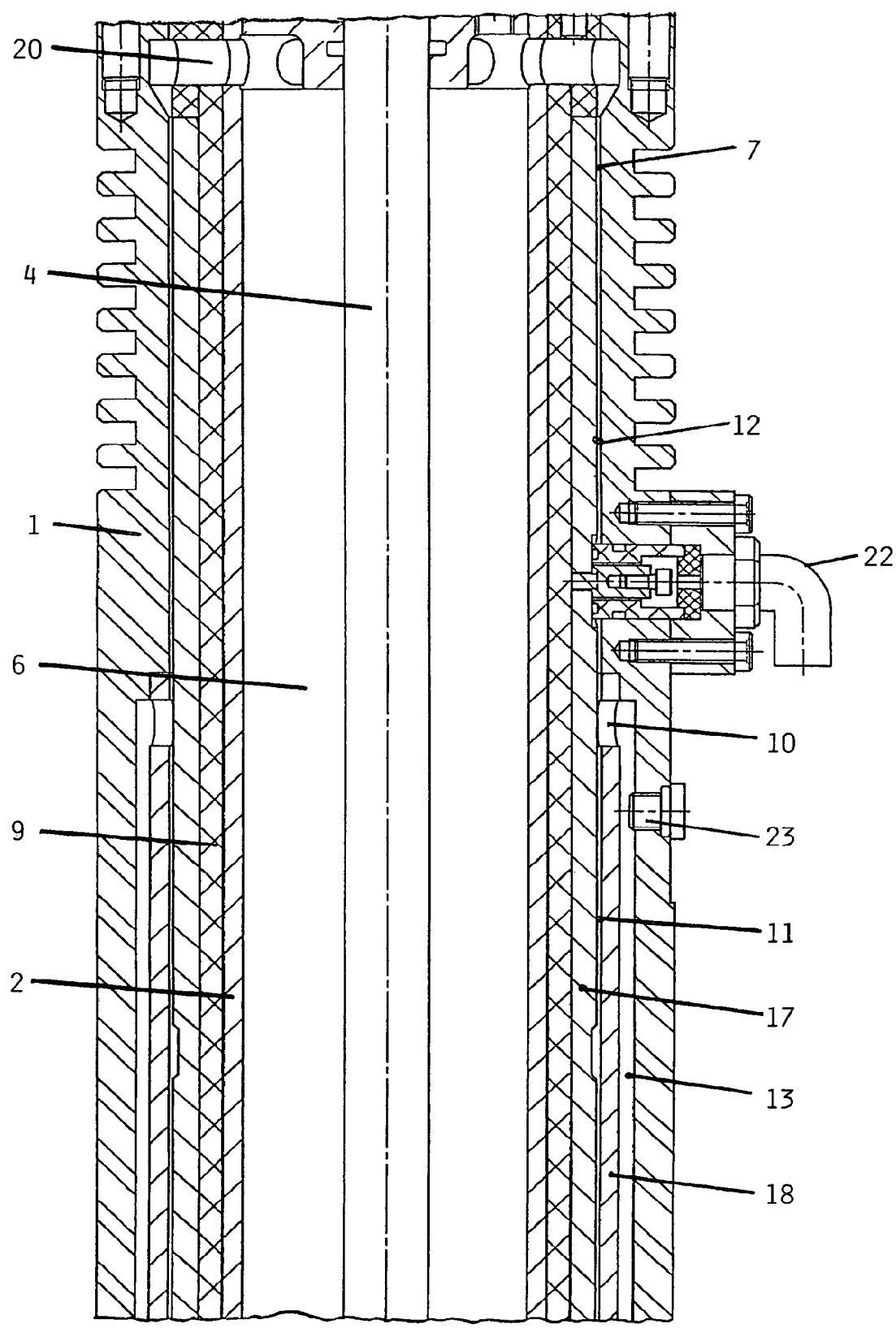
FIG. 3: is an enlarged detail view of a portion of FIG. 1.

FIG. 2 of the drawing schematically illustrates an alternative example embodiment in which the throttle gap sections 11, 12 connecting the pressure medium chambers 5, 6, with the bypass gap 13 and the intersection or gating point 10 are arranged in or on the piston 3. Thereby the reference characters in FIG. 2 of the drawing correspond to the functionally equivalent reference characters of the FIG. 1. The vibration damper according to FIG. 2 similarly includes a cylinder-shaped housing 1 as a pressure medium chamber in which a piston 3 is axially movably guided, which divides the pressure medium chamber into an extension chamber 6 and a retraction chamber 5. The piston 3 is embodied longer in its axial extent than the one in FIG. 1 of the drawing, because the functionally essential control components with the throttle gap sections 11, 12 and the bypass gap 13 are provided in or on this piston 3. For that purpose, an axial throttle gap 7 is arranged on the outer circumferential wall surface of the piston 3, and the throttle gap 7 is open both to the extension chamber 6 as well as to the retraction chamber 5 and connects these two with one another. This is preferably arranged ring-shaped about the outer circumferential surface of the piston 3.

With a provided damping ratio of 2:1 of the extension springing damping relative to the retraction springing damping, a gap intersection or gating point 10 is provided approximately in the axial middle of the piston 3 between a first throttle gap section 11 and a second throttle gap section 12, and simultaneously a bypass gap 13 branches off from the gap intersection or gating point 10 to the retraction chamber 5. This gap intersection or gating point 10 can preferably be embodied as a flat annular or ring bore, which establishes a connection between all gap sections 11, 12, 13. Similarly it is also possible that several bypass gaps 13 are guided from the gap intersection or gating point 10 on the piston outer wall or within the piston 3. Several gap intersection or gating points 10 can also be provided on the circumference of the piston 3 in various different radial sections, but all of these gap intersection or gating points 10 must be connected with one another. In that regard, a separate bypass gap 13 can be guided, from each individual separate gap intersection or gating point 10 to the retraction chamber 5, which is provided with a separate non-return check valve 14, which must be open or at least switchable to an open condition toward the retraction chamber 5 (i.e. to allow fluid flow from the retraction chamber 5).

In the provided example embodiment, a non-return check valve 14 that is open for flow from the retraction chamber 5 is provided in the bypass gap 13 between the gap intersection or gating point 10 and the piston bottom side toward the retraction chamber 5. Such a non-return check valve 14 that is open for flow from the retraction chamber 5 can also be embodied as an adjustable overflow valve. An electrode 17 as a field force generating element is arranged parallel and coaxial to the throttle gap sections 11, 12 in an insulated manner in the inner cylindrical wall surface or on the outer cylindrical wall surface of the housing 1, whereby the electrode 17 extends over the entire piston stroke section. Alternatively, the piston surface can also be embodied as the plus electrode and the cylinder surface can be embodied as the ground pole. An electrorheological fluid as a pressure medium is located in both pressure medium chambers 5, 6, and the arising vibrations are dampable in a controlled manner by the electrorheological fluid.

Such a vibration damper can also be embodied with magnetorheological fluids, if a current coil for magnetic field generation is provided as the force generating element instead of the electrode 17 generating an electric field. For volume compensation for the longitudinally slidable piston rod 4, still additionally a reservoir chamber 8 with a compressible gas is provided, which is separated from the retraction chamber 5 by a sealed rodless piston 21.

The vibration damper according to FIG. 2 of the drawing can similarly be utilized as a controllable shock absorber as well as for other controlled vibration damping applications. The throttle gap sections 11, 12 need not extend coaxially, axially to or on the piston circumferential wall surface, but rather can also be guided as linear or screw-shaped channels or in other gap-type patterns, whereby it simply depends on their controllable throughflow resistance relative to the vibration forces.

In a further embodiment form, the throttle gap sections 11, 12 could also be guided inwardly openly on the inner circumferential wall surface of the pressure medium cylinder in the housing 1, whereby it must be ensured that the gap intersection or gating point 10 always remains covered by the piston circumferential wall surface. This is, however, only conceivable in connection with elongated piston embodiments with small vibration strokes. Thereby the ratio of the extension springing damping relative to the retraction springing damping could also be changed simultaneously with the piston motion. For such an embodiment, the bypass gap 13 with the non-return check valve 14 must, however, be guided closed within the housing wall, so that the ratio of the extension springing damping relative to the retraction springing damping is only changed to a significant extent for a larger piston stroke.

The invention claimed is:

1. Vibration damper, which includes a pressure medium cylinder, in which a piston with a piston rod is arranged in an axially slidable manner, which piston divides the pressure medium cylinder into a retraction chamber and an extension chamber, in which an electrorheological or magnetorheological fluid is contained as a pressure medium, whereby the retraction chamber and the extension chamber are connected with one another at least by a throttle gap in the region of which at least one field force generating element is arranged, whereby at least one non-return check valve is arranged in a bypass gap, characterized in that a length of the throttle gap is divided by a gap intersection point into a first throttle gap section and a second throttle gap section, wherein the second throttle gap section is connected with the extension chamber and the first throttle gap section is connected with the retraction chamber, and wherein the bypass gap is connected parallel to the first gap section between the gap intersection point and the retraction chamber.

2. Vibration damper according to claim 1, characterized in that the two throttle gap sections and the bypass gap are formed as enclosed gaps bounded within a cylindrical housing of the vibration damper.

3. Vibration damper according to claim 1, characterized in that the two throttle gap sections and the bypass gap are provided in the piston or on an outer circumferential wall surface of the piston.

4. Vibration damper according to claim 1, comprising plural said non-return check valves which are separately controlled electromagnetic valves or electrorheological or magnetorheological valves.

5. Vibration damper according to claim 1, characterized in that the non-return check valve is an adjustable overflow valve.

6. Vibration damper according to claim 1, characterized in that the two throttle gap sections are respectively acted on by separately regulated field force generating elements.

7. Vibration damper according to claim 1, which is a motor vehicle shock absorber for damping retraction or extension springing forces on a motor vehicle.

8. Vibration damper according to claim 1, wherein the non-return check valve is open for flow of the fluid through the bypass gap from the retraction chamber toward the extension chamber.

9. A rheological damper for damping vibrations between two components, said damper comprising:
- a housing including a cylinder that bounds a cylindrical space therein, wherein said housing is to be connected to a first one of the two components;
- a piston that is axially slidable in said cylinder and divides said cylindrical space into a first fluid chamber and a second fluid chamber on opposite sides of said piston;
- a piston rod that is connected to said piston, extends out from said housing, and is to be connected to a second one of the two components;
- an electrorheological or magnetorheological damping fluid contained in said first and second fluid chambers;
- a first throttle passage communicating with said first fluid chamber, a second throttle passage communicating with said second fluid chamber, and a passage junction at which said first and second throttle passage communicate with one another in series between said first fluid chamber and said second fluid chamber;
- at least one electric or magnetic field generating element that is arranged adjacent to at least a portion of said first throttle passage and at least a portion of said second throttle passage, and that is adapted to generate an electric or magnetic field effective in said first throttle passage and in said second throttle passage;
- a bypass passage that communicates between said first fluid chamber and said passage junction in parallel with said first throttle passage; and
- a valve interposed in said bypass passage, wherein said valve is selected from the group consisting of one-way non-return check valves, controllable electromagnetic valves, controllable electrorheological valves, controllable magnetorheological valves, and adjustable overflow valves.

10. The rheological damper according to claim 9, wherein said valve comprises one of said one-way non-return check valves.

11. The rheological damper according to claim 10, wherein said one-way non-return check valve is arranged and adapted so as to allow fluid flow through said bypass passage in a direction from said first fluid chamber toward said passage junction and so as to block fluid flow through said bypass passage in a direction from said passage junction toward said first fluid chamber, and wherein said piston rod extends from said piston axially through said second fluid chamber and thence out from said housing.

12. The rheological damper according to claim 9, wherein said cylinder is a cylindrical inner pipe, said housing further includes a cylindrical outer pipe arranged coaxially outwardly around said inner pipe, said damper further includes an intermediate pipe arranged coaxially between said inner pipe and said outer pipe along only a portion of an axial length of said inner pipe and said outer pipe, said bypass passage is located radially between said outer pipe and said intermediate pipe, said first throttle passage is located radially between said intermediate pipe and said inner pipe, and said second throttle passage is located radially between said outer pipe and said inner pipe.

13. The rheological damper according to claim 12, further comprising an insulation arranged outwardly coaxially around said inner pipe and radially inwardly from said intermediate pipe and from said outer pipe, wherein said at least one electric or magnetic field generating element is or are arranged outwardly coaxially around said insulation, said bypass passage is defined and bounded radially between said outer pipe and said intermediate pipe, said first throttle passage is defined and bounded radially between said intermediate pipe and said at least one electric or magnetic field generating element, and said second throttle passage is defined and bounded radially between said outer pipe and said at least one electric or magnetic field generating element.

14. The rheological damper according to claim 9, wherein said valve comprises one of said electrorheological or magnetorheological valves.

15. The rheological damper according to claim 9, wherein said valve comprises one of said adjustable overflow valves.

16. The rheological damper according to claim 9, wherein said first and second throttle passages and said bypass passage each respectively extend in an axial direction on an outer circumferential wall of said piston or in said piston.

17. The rheological damper according to claim 9, wherein said first and second throttle passages and said bypass passage are each respectively configured as one or more passages along a cylindrical annulus coaxially around said cylinder.

18. The rheological damper according to claim 9, wherein said bypass passage is without any electric or magnetic field generating element acting thereon.

19. The rheological damper according to claim 9, wherein said bypass passage extends axially along at least one half of a total axial length of said first and second throttle passages connected together at said passage junction.

20. The rheological damper according to claim 9, wherein said bypass passage and said first throttle passage each respectively have an axial length greater than one and up to three times an axial length of said second throttle passage.

* * * * *